US008522218B2

(12) United States Patent
Biswas et al.

(10) Patent No.: US 8,522,218 B2
(45) Date of Patent: Aug. 27, 2013

(54) CROSS-MODULE INLINING CANDIDATE IDENTIFICATION

(75) Inventors: Surupa Biswas, Bellevue, WA (US);
David Jerome Hiniker, Seattle, WA (US); Jan Kotas, Redmond, WA (US);
Frank V. Peschel-Gallee, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 441 days.

(21) Appl. No.: 12/722,560

(22) Filed: Mar. 12, 2010

(65) Prior Publication Data
US 2011/0225564 A1  Sep. 15, 2011

(51) Int. Cl.
*G06F 9/45* (2006.01)

(52) U.S. Cl.
USPC ........... 717/140; 717/145; 717/151; 717/154; 717/157

(58) Field of Classification Search
None
See application file for complete search history.

(56) References Cited

U.S. PATENT DOCUMENTS

| 5,768,595 | A  | * | 6/1998 | Gillies | 717/145 |
| 5,790,861 | A  | * | 8/1998 | Rose et al. | 717/145 |
| 5,960,196 | A  | * | 9/1999 | Carrier et al. | 717/122 |
| 6,195,793 | B1 | * | 2/2001 | Schmidt | 717/151 |
| 6,247,174 | B1 | * | 6/2001 | Santhanam et al. | 717/154 |
| 6,738,966 | B1 | * | 5/2004 | Tanaka | 717/140 |
| 7,426,725 | B2 | * | 9/2008 | Moon et al. | 717/157 |
| 7,996,825 | B2 | * | 8/2011 | Chakrabarti et al. | 717/140 |
| 2005/0097528 | A1 | * | 5/2005 | Chakrabarti et al. | 717/140 |
| 2005/0155012 | A1 | * | 7/2005 | Tayama et al. | 717/101 |
| 2005/0188363 | A1 | * | 8/2005 | Moon et al. | 717/157 |
| 2007/0157178 | A1 |   | 7/2007 | Kogan et al. | |
| 2009/0055814 | A1 |   | 2/2009 | Gallop et al. | |
| 2010/0077387 | A1 | * | 3/2010 | Callaghan et al. | 717/140 |

OTHER PUBLICATIONS

Keith D. Cooper et al., Unexpected Side Effects of Inline Substitution: A Case Study, 1992 ACM, pp. 22-32, <http://dl.acm.org/citation.cfm?id=130619>.*
Andrew Ayers et al., Scalable Cross-Module Optimization, 1998 ACM, pp. 301-312, <http://dl.acm.org/citation.cfm?id=277745>.*
Andrew Ayers et al., Aggressive Inlining, 1997 ACM, pp. 134-145, <http://dl.acm.org/citation.cfm?id=258928>.*
Zhong Shao, Typed Cross-Module Compilation, 1998 ACM, pp. 141-152, <http://dl.acm.org/citation.cfm?id=289436>.*
Dhruva R. Chakrabarti et al., Inline Analysis: Beyond Selection Heuristics, 2006 IEEE, pp. 221-232, <http://dl.acm.org/citation.cfm?id=1122407>.*

(Continued)

*Primary Examiner* — Thuy Dao
*Assistant Examiner* — Cuong V Luu
(74) *Attorney, Agent, or Firm* — Ogilvie Law Firm

(57) ABSTRACT

Routines which are likely to be good candidates for cross-module inlining are automatically identified according to criteria based on service history, compiler inlining criteria, and/or execution performance criteria. Candidates can also be automatically identified by pattern matching codes of routines which satisfy service history, execution performance, and/or compiler criteria. Automatically identified candidate routines are presented in an inlining advisory tool, allowing developers to approve/veto automatically identified candidates, to add other routines, and to either suggest or require that the development tools perform cross-module inlining with particular routines. Changes to a candidate routine can trigger regeneration of native image(s) into which the routine has been compiled.

20 Claims, 3 Drawing Sheets

(56) References Cited

OTHER PUBLICATIONS

Luis A. Lozano et al., Scalable High Performance Cross-Module Inlining, 2004 IEEE, pp. 165-176, <http://dl.acm.org/citation.cfm?id=1026006>.*

Chakrabarti, et al., "Inline Analysis: Beyond Selection Heuristics ", Proceedings of the International Symposium on Code Generation and Optimization (CGO'06), 2006, Retrieved at << http://ieeexplore.ieee.org/stamp/stamp.jsp? tp=&arnumber=1611543, Pages 12.

Srivastava, et al., "Vulcan—Binary Transformation in a Distributed Environment ", Apr. 20, 2001, Retrieved at << http://research.microsoft.com/pubs/69850/tr-2001-50.pdf>>, Pages 12.

Moon, et al., "Syzygy—A Framework for Scalable Cross-Module IPO ", Proceedings of the International Symposium on Code Generation and Optimization (CGO 2004), 2004, Retrieved at << http://citeseerx.ist.psu.edu/viewdoc/download?doi=10.1.1.115.4686&rep=rep1&type=pdf, Pages 10.

* cited by examiner

CROSS-MODULE INLINING CANDIDATE IDENTIFICATION

BACKGROUND

Inline expansion, also called "inlining", is a manual or automated (e.g., by a compiler or linker) modification of software code that replaces a routine call with the body of the called routine. Some languages, such as C and C++, support an "inline" keyword in routine definitions, allowing developers to suggest to a compiler that the compiler should try to inline the routine. Compilers use developer suggestions and other criteria to decide which routine calls should be inlined. Linkers may perform inlining, e.g., with routines whose source is not available and with library routines. Run-time systems may also perform inlining.

An inlining optimization may improve a program's time and space usage at runtime, but may also increase the size of the program's binary file. Inlining tends to improve code execution speed, but inlining may also decrease performance. For example, inserting multiple copies of a routine may increase code size enough that the code no longer fits in the cache, resulting in more cache misses. In an embedded system, smaller code size may be more important than faster code execution, making inlining unattractive. In some systems, added variables from inlining may increase processor register usage enough to cause extra RAM accesses, thereby decreasing execution speed. Some routines cannot be inlined, such as some recursive routines.

SUMMARY

Code generators can inline code from one module of an application program into another module of the application to save the overhead of calling a routine. Sometimes inlining across module boundaries can improve application performance. However, decisions about cross-module inlining involve trade-offs. If the modules can evolve independently, evolving one module often invalidates binary code of the other module. Regenerating invalidated code can be time and resource intensive.

Some embodiments provided herein help identify routines which are likely to be good candidates for cross-module inlining in view of the trade-offs involved. Candidates can be automatically identified according to criteria such as service history criteria, compiler inlining criteria, and/or execution performance criteria. For example, a candidate for cross-module inlining may be a routine whose service history shows it has been modified less frequently and/or less extensively than a specified threshold. Alternately, or in addition, candidates can be automatically identified by pattern matching codes of routines which satisfy service history, execution performance, and/or compiler criteria. Particular kinds of routines may also be identified as candidates for cross-module inlining, such as: a property get or set routine backed by a field, a property backed by bit(s) of a single field or by a constant value, certain Boolean properties, a setting constructor, certain equality or inequality operators, certain cast operators, and wrapper functions that add constant values.

Automatically identified candidate routines can be presented to a developer for consideration in an inlining advisory tool. The inlining advisory tool gives developers power to approve/veto automatically identified candidates, to add other routines, and to either suggest or require that the development tools perform cross-module inlining with particular routines. In some cases, changes to an automatically identified routine can trigger regeneration of native image(s) into which the routine has been compiled The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
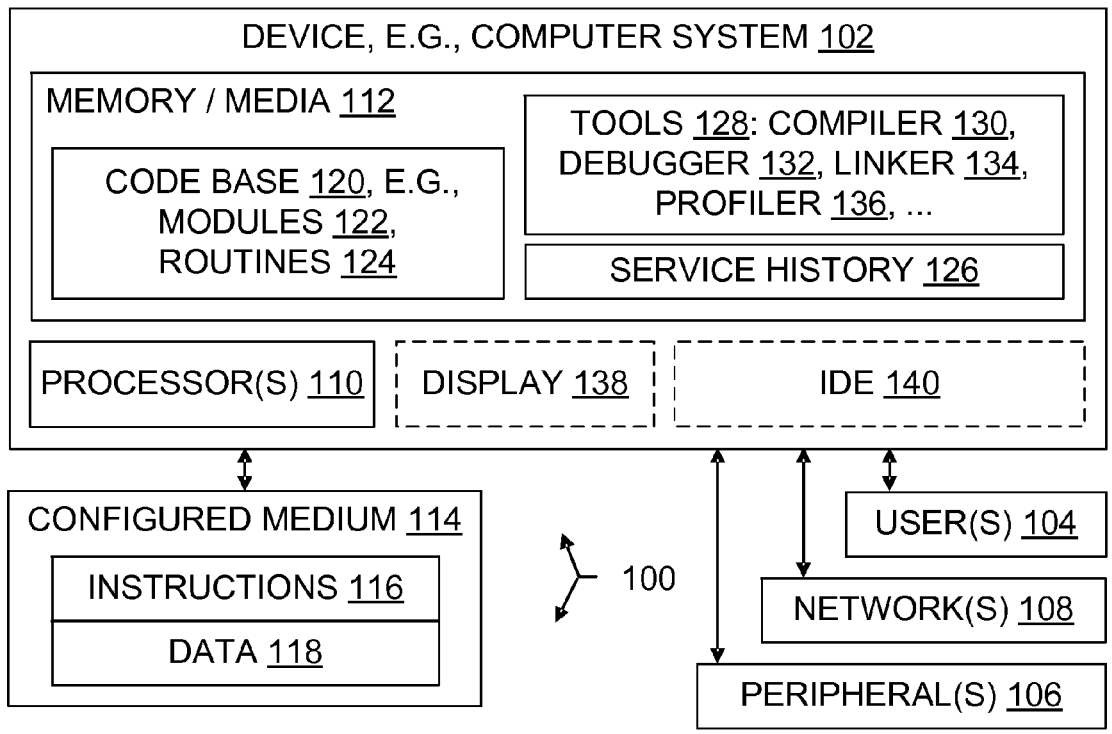
FIG. 1 is a block diagram illustrating a computer system having at least one processor, at least one memory, a collection of routines to search for cross-module inlining candidates, and other items in an operating environment which may be present on multiple network nodes, and also illustrating configured storage medium embodiments.

Many virtual execution environments support both dynamic code generation and ahead-of-time (AOT) compilation. AOT binaries are persisted, can be shared across processes, and typically result in significant improvements in startup time and memory usage of applications over dynamic code generation. Native execution environments support only AOT binaries.

Code generators can inline code from one function to another to save the overhead of making a function call and to enable further optimizations, thereby generating code that runs faster. Performing such inlining across module boundaries (called cross-module inlining) can improve application performance.

However if the modules can evolve independently, it may be desirable to associate a high value with the inlining decision since evolving one module often invalidates the AOT binary of the other module. Regenerating invalidated AOT binaries can be time and resource (CPU, memory, disk) intensive. Redistributing regenerated AOT binaries for native execution environments can be difficult or impractical, e.g., for libraries consumed by many applications when the application and the library vendors are different entities.

Some familiar approaches to cross-module inlining include disallowing cross-module inlining, always regenerating affected AOT binaries, and/or relying solely on subjective developer annotations to select cross-module inlining candidates.

By contrast, approaches presented herein support a simple and automatic scheme that can be applied to pre-compiled managed (such as C# and Java) and native (such as C and C++) code to enable performance wins from cross-module inlining. Some embodiments described herein use heuristics based on shapes of functions to identify functions that are high-value to inline across modules and that are also unlikely to evolve and hence unlikely to affect other AOT binaries. The identified functions can be tagged, e.g., by a binary-rewriting tool, with the code generator configured to only inline such tagged functions across module boundaries. The heuristics can also be used to create an inlining advisory tool that flags such methods; developers can examine the flagged methods and tag them appropriately.

Some embodiments provide a system that automatically processes binaries to enable high-value cross-module inlining without affecting the modules that the code got inlined into. Some provide heuristics that identify high-value cross-module inlining candidates. Some embodiments provide an inlining advisor that provides developers with an assessment of whether a particular function is a good/safe cross-module inline candidate. Some provide a scheme that allows a mix of automatically-identified and developer-identified functions to be inlined across modules. In some embodiments, heuristics are used to automatically identify patterns of functions/methods that are high-value and safe to inline across modules.

In some embodiments, identified functions are automatically tagged by a binary-rewriting tool. In some, the code generator is modified to only inline these tagged functions across module boundaries. Any modification made to such a tagged function is flagged automatically as a violation during build. Functions automatically identified by these heuristics can be complemented with developer-identified functions. The heuristics can also be used with an inlining advisory tool that helps developers easily and consistently tag functions for cross-module inlining.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyper-threaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

"Routine" means a function, method, or other segment of code which receives control non-sequentially and then returns, e.g., via an address pushed on a call stack. Other than parameterless void routines which neither accept parameters nor return a value, routines also use a stack to receive and/or return value(s).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

Throughout this document, use of the optional plural "(s)" means that one or more of the indicated feature is present. For example, "routine(s)" means "one or more routines" or equivalently "at least one routine". Similarly, "criterion" means "one or more criteria" or equivalently "at least one criterion".

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable non-transitory storage media 112. Media 112 may be of different physical types. The media 112 may be volatile memory, non-volatile memory, fixed in place media, removable media, magnetic media, optical media, and/or of other types of non-transitory media (as opposed to transitory media such as a wire that merely propagates a signal). In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by as discussed herein, e.g., by inlining, binding, deployment, execution, modification, display, creation, loading, and/or other operations.

A code base 120 containing modules 122 and routines 124, a service history 126 tracking changes to the routines 124, and development tools 128 such as compiler(s) 130, debugger(s) 132, linker(s) 134, and/or profiler(s) 136, and other items shown in the Figures may reside partially or entirely within one or more media 112, thereby configuring those media. An operating environment may also include a display 138 and other hardware, such as buses, power supplies, and accelerators, for instance.

A given operating environment 100 may include an Integrated Development Environment (IDE) 140 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs, as well as with endeavors outside the field of software development per se that use inlining.

Some items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
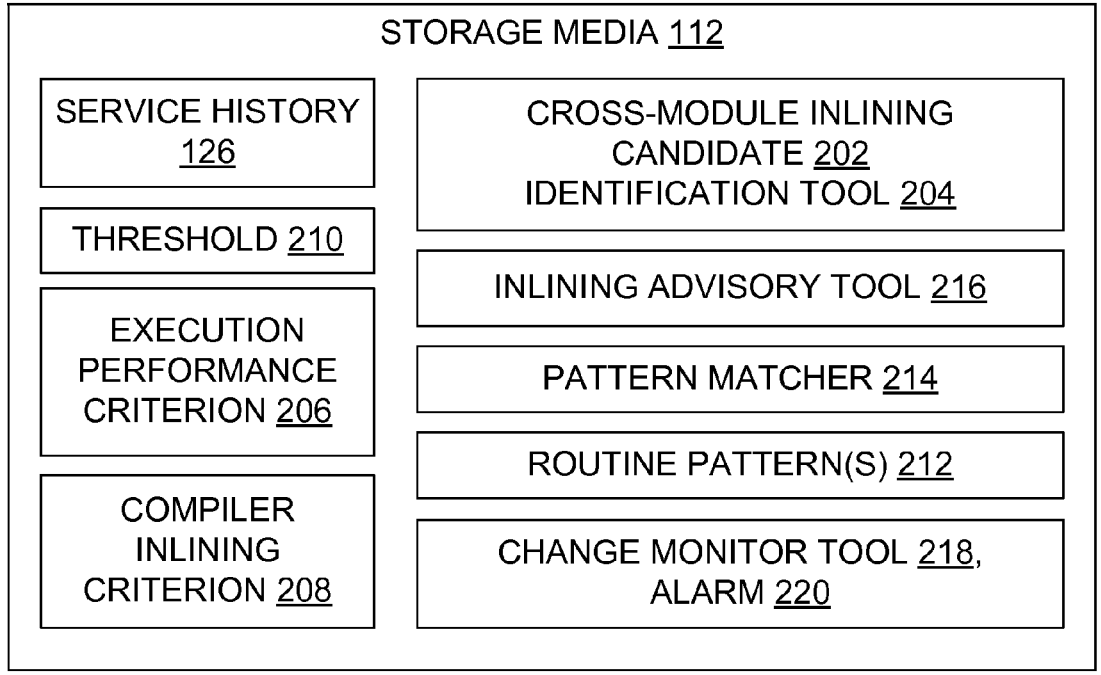
FIG. 2 is block diagram illustrating automatic identification of cross-module inlining candidates in an example architecture.

FIG. 2 illustrates an architecture which is suitable for use with some embodiments. Candidates 202 for cross-module inlining are automatically identified by an identification tool 204. The identification tool identifies candidates by analyzing routines 124, and in particular by testing routines 124 against criteria such as the frequency/extent of modification (based on the service history 126), compliance with one or more execution performance criteria 206, and one or more compiler inlining criteria 208.

The frequency/extent of modification to a routine may be specified using threshold(s) 210, e.g., "not modified within the past six months", "not modified more than twice within the past three years", "not modified except possibly within test code sections that are automatically excluded from production builds", and so on.

The execution performance criteria 206 may also be specified using threshold(s) 210, e.g. "called at least fifty times during execution" or "called from at least ten locations in the code".

The compiler inlining criteria 208 may also be specified using threshold(s) 210, e.g. "routine body is less than ten lines of source code" or "routine body includes less than 64 bytes of intermediate language code".

Routines 124 which satisfy the specified criteria can be classified into patterns 212, manually and/or with automatic assistance. The identification tool can then identify candidates by analyzing routines 124 with a syntactic and/or semantic pattern matcher 214 to identify routines 124 that match one or more specified patterns 212 designating good candidates for cross-module inlining. With reference to Microsoft® Intermediate Language (MSIL), one example pattern 212 of good candidates is property getters and setters backed by a field.

In such methods, the implementation is a known MSIL sequence for single field fetch or store, having the specialname flag set, and the method name starts with "get_" or "set_". Another example pattern 212 is setting constructors, whose implementation is zero or more stores of parameters to fields after an optional call to a base constructor, who sets a specialname flag, and whose method name includes ".ctor". Setting constructors merely assign their parameters to the fields of an object being constructed, whereas other constructors may simply allocate an object (and not initialize fields to any values) or do additional things. A third example pattern 212 is wrapper functions that add constant values (defaults); their implementation is setting up zero or more parameters (parameters to the current method or constant values) followed by a single call-ret sequence targeting a method in the same class.

An inlining advisory tool 216 gives developers power to approve/veto automatically identified candidates 202, to add other routines 124 as candidates, and to either suggest or require that the development tools 128 perform cross-module inlining with particular routines. In one embodiment, the inlining advisory tool 216 includes a graphical user interface (GUI) which gives convenient access to the results of the identification tool 204. The inlining advisory tool 216, the service history 126, and/or the identification tool 204 may be part of an integrated development environment 140.

In some embodiments, a change monitor tool 218 also accesses the results of the identification tool 204, e.g., attributes or tags on particular routines designating them as cross-module inlining candidates. In some cases, an alarm 220 such as an error message, warning, or build refusal, is raised when an attempt is made to change an inlined routine 124 or an inlining candidate 202. Such alarms may help reduce invalidation/regeneration of binary images.

With reference to FIGS. 1 and 2, some embodiments provide a computer system 102 with a logical processor 110 and a memory medium 112 configured by circuitry, firmware, and/or software to facilitate management of cross-module inlining by extending functionality with an identification tool 204, an inlining advisory tool 216, and/or a change monitor tool 218, for example, as described herein.

One embodiment includes a processor 110 in operable communication with a memory for tool execution, a service history 126 in the memory for a collection of routines 124, an execution performance criterion 206 also residing in the memory, and a cross-module inlining candidate identification tool 204 in operable communication with the service history and the execution performance criterion. In one variation, some systems include a compiler inlining criterion 208 also residing in the memory in operable communication with the tool 204. Some include an inlining advisory tool 216 in the memory. Some include a pattern matcher 214 and at least one relatively frequent routine pattern 212 of a routine 124 that has been modified less than a specified threshold 210 according to the service history 126. The relatively frequent routine pattern(s) 212 reside in the memory in operable communication with the candidate identification tool 204.

Some systems also include test automation, in the form of a change monitor tool 218 in operable communication with the relatively frequent routine pattern(s) 212 and with a code base 120. The system is configured to raise an alarm 220 if the change monitor tool detects a change in an implementation of a routine 124 of the code base and if that routine also matches a relatively frequent routine pattern 212. In some embodiments, the patterns are tunable. If the alarm 220 is raised too frequently, the developer may narrow the range of the patterns 212 to encompass fewer routines.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment. For example, the code base 120 may be on multiple devices/systems 102 in a networked cloud, the service history 126 may be stored on yet other devices within the cloud, and the tool(s) 204, 216, 218 may configure the display(s) 138 on yet other cloud device(s)/system(s) 102.

Processes

Figure 3:
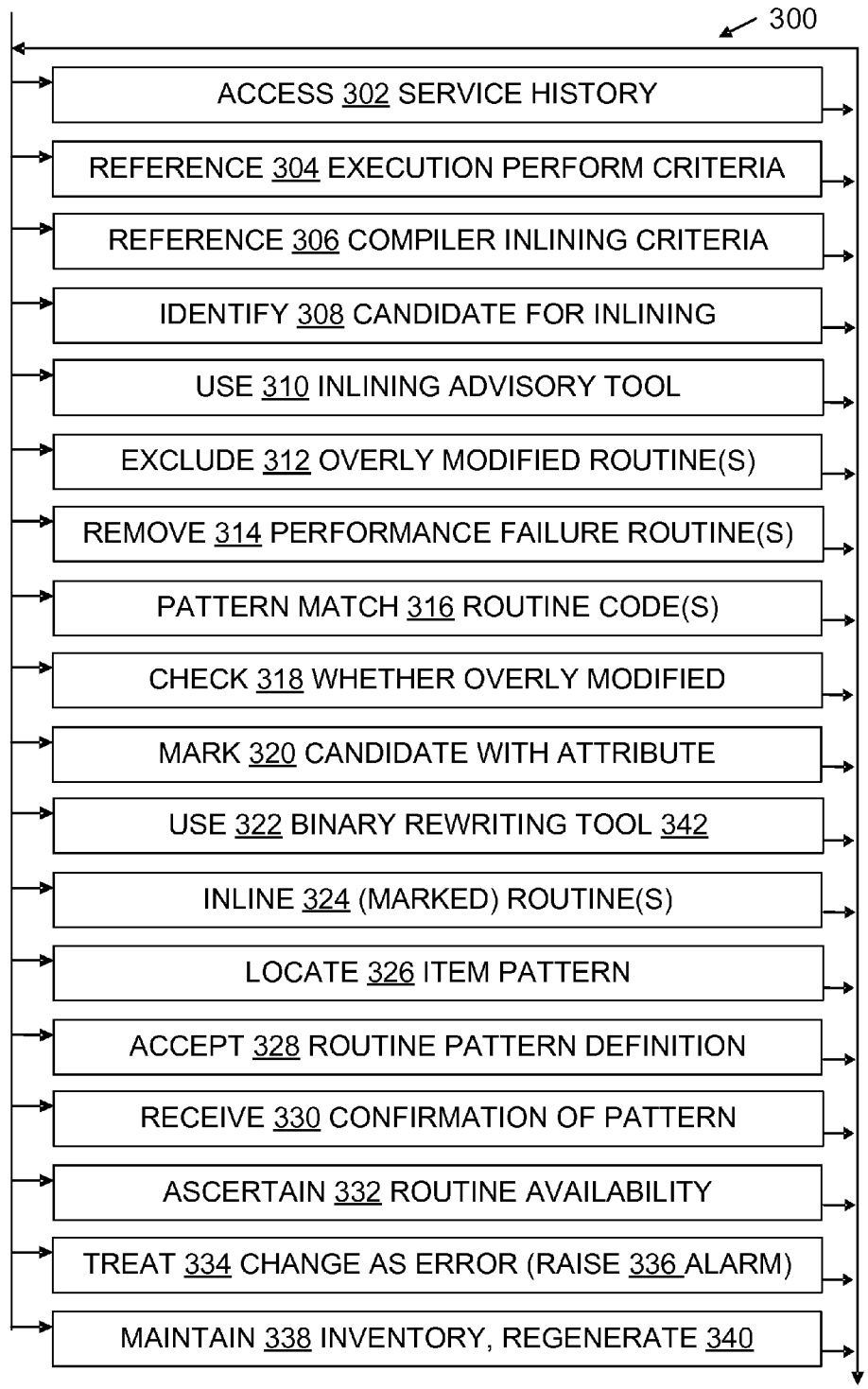
FIG. 3 is a flow chart illustrating steps of some process and configured storage medium embodiments.

FIG. 3 illustrates some process embodiments in a flowchart 300. Processes shown in the Figures may be performed in some embodiments automatically, e.g., by an identification tool 204 under control of a script requiring little or no user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a history accessing step 302, an embodiment access a service history 126 for a collection of routines 124. Step 302 may utilize a version control system, an IDE 140, and/or other tools which maintain a record of when a given routine and/or a module containing a given routine was last modified.

During an execution performance criterion referencing step 304, an embodiment references at least one execution performance criterion 206. Reference may be to an explicit statement of the criterion, such as a criterion selected by a tool 204 user, or reference may be implicit and embedded in the code used to implement a tool 204.

During compiler inlining criterion referencing step 306, an embodiment references at least one compiler inlining criterion 208. Reference may be to an explicit statement of the criterion, such as a criterion selected by a tool 204 user, or reference may be implicit and embedded in the code used to implement a tool 204.

During an identifying step 308, an embodiment identifies at least one routine as a candidate 202 for cross-module inlining by determining that all specified criteria are met by the routine. Criteria-based steps 302, 304, 306 may be viewed as part of identifying step 308, or as precursors to step 308. However, steps 302, 304, 306 may also occur when a routine fails to meet all specified criteria and thus is not identified 308 as a candidate for cross-module inlining.

During an advisory tool using step 310, an embodiment uses an inlining advisory tool 310 by presenting candidates 202 to a developer, by receiving accept/reject input from a developer as to whether a particular candidate 202 should remain a candidate, by accepting input from a developer to add as a candidate a routine that was not automatically identified 308, and so on.

Like other steps involving user interaction, step 310 can be viewed from a hardware/software perspective or from a human user perspective. From the human user perspective, during step 310 a developer uses an inlining advisory tool 310 by viewing a display or other list of candidates 202, by accepting/rejecting a particular candidate 202 proposed automatically, by entering as a candidate a routine that was not automatically identified 308, and so on.

During an excluding step 312, an embodiment excludes from candidacy (or prospective candidacy) for cross-module inlining a routine that has been modified too frequently and/or too extensively. That is, a routine 124 that fails to satisfy a service history threshold criterion is excluded from a set of candidates 202. Exclusion may be done by removing a routine that was previously identified 308 under different criteria, or by preventing a routine from being tagged as a candidate in the first case, for example.

During removing step 314, an embodiment excludes from candidacy (or prospective candidacy) for cross-module inlining a routine that fails to satisfy an execution performance criterion. Removal under step 314 may be done by removing a routine that was previously identified 308 under different criteria, or by preventing a routine from being tagged as a candidate in the first case, for example.

During a pattern matching step 316, an embodiment compares a routine 124 to a specified routine pattern 212 and determines whether the routine matches the pattern. Pattern matching step 316 may be performed using syntactic analysis and/or semantic analysis of the kind used during compilation, for example, although the analysis is directed in step 316 toward pattern matching for candidate 202 identification or pattern 212 generation, rather than for direct code generation. Indeed, in some embodiments, pattern matching step 316 and candidate identification step 308 are integrated with compilation, from the developer's perspective.

During a checking step 318, an embodiment checks a routine's service history, in the context of a specified threshold 210, to determine whether the routine has been modified too frequently and/or too extensively to qualify as a candidate for cross-module inlining. Service history accessing step 302 may be part of checking step 318, or the service history might be implicit in the context of step 318.

During a marking step 320, an embodiment marks a routine 124 to indicate that it is a candidate 202. An attribute can be added to an intermediate code representation of the routine to perform marking, for example, or external data such as a candidate pointer or candidate list can be updated to specify the routine.

During a binary rewriter using step 322, a binary rewriting tool 342 (a.k.a. binary rewriter) is used to tag a routine 124 to indicate that it should be cross-module inlined, or that it can be inlined.

During an inlining step 324, a routine 124 is inlined across a module boundary. Inlining may be in response to tagging of the routine during step 322, in response to marking 320 of the routine, or in response to other factors. Routines that were not automatically identified 308 may nonetheless be inlined 324 in some cases, and routines that were automatically identified 308 might not be inlined 324, in some cases, since compilers and other tools 128 ultimately determine which routines actually get inlined.

During a pattern locating step 326, an embodiment locates a routine pattern 212. For example, patterns 212 may reside in a file containing templates, similar to a parsing definition file used in defining programming language syntax/semantics. Patterns 212 may be hard-coded into parsing code in a tool 204, in which case locating patterns involves passing control to such parsing code.

During a pattern definition accepting step 328, an embodiment accepts from a user 104 a definition of a routine pattern 212. Acceptance may include receiving a pattern file, for example, or receiving through a GUI a selection of one or more predefined patterns. For instance, a developer might turn on acceptance of a setting constructor pattern 212, using a GUI in an identification tool 204 or a GUI in an advisory tool 216. Developers may also define patterns 212. For example, a developer might provide a routine pattern definition to match a function whose implementation follows directly from its function signature.

During a pattern confirmation receiving step 330, an embodiment receives from a user a confirmation of a routine pattern 212. Confirmation may be explicit, as when a developer selects a displayed pattern through a GUI or enters a value indicating that all current pattern definitions should be applied. Confirmation may also be implicit, as when a developer is given an opportunity to reject a pattern 212 and does not do so.

During an availability ascertaining step 332, an embodiment ascertains whether a candidate routine within a particular development environment such as a system 102 will be available for use in at least one module 122 whose identity is unspecified within that development environment at the point in time when the routine is identified as a candidate for cross-module inlining. That is, some routines will be made available only to modules whose identity is known or at least known to be determinable; such modules could be located and regenerated if necessary after the candidate routine is modified. But other routines will be published for use in modules which are not inventoried, are not strictly local, and are not otherwise specified. Changes to such widely published routines can lead to invalidation of module binaries, with no feasible way for the developer of the routine to identify and hence to regenerate those modules. Availability ascertaining step 332 may be performed, for example, by receiving input from the developer or from a configuration file about the intended/allowed distribution of the candidate routine.

If a candidate routine is ascertained 332 to be available for use in modules that are unspecified and that cannot be readily specified, then during a treating step 334 an embodiment (in an IDE 140, for instance) treats a proposed (or in some cases an actual) change in the candidate routine as an error. The embodiment may refuse to allow the change at all (e.g., by making the routine read-only in an editor), or the embodiment may refuse to allow in the changed code as part of a build. The embodiment may also raise 336 an alarm, e.g., by displaying a message in a GUI of a tool.

During an inventory maintaining step 338, however, some embodiments maintain a list, table, directory, registry, or other inventory of modules 122 and their dependencies on particular version(s) of certain routine(s), which could be all routines or candidate routines only, depending on the embodiment. As a result of inventorying step 338, all modules in which a candidate routine is (or might be) inlined 324 can be specified during the ascertaining step 332. Changes to a candidate routine can then be allowed, followed by mandated and/or automated regeneration 340 of module images that include the candidate's code.

The foregoing steps and their interrelationships are discussed in greater detail below, in connection with various embodiments. Those of skill will understand that implementation details herein may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

Some embodiments provide a process for managing cross-module inlining. The process includes accessing 302 a service history 126 for a collection of routines 124, such as routines in a particular code base 120. The process also includes automatically identifying 308 as a candidate 202 for cross-module inlining a routine 124 which according to the service history has been modified less than a specified threshold 210.

In one variation, some embodiments also reference 304 an execution performance criterion 206. These embodiments automatically identify 308 as a candidate 202 for cross-module inlining a routine 124 which satisfies the execution performance criterion and which according to the service history also has been modified less than the specified threshold.

In another variation, some embodiments also reference 306 a compiler inlining criterion 208. These embodiments automatically identify 308 as a candidate 202 for cross-module inlining a routine 124 which satisfies the compiler inlining criterion and which according to the service history also has been modified less than the specified threshold.

Some embodiments reference 304 an execution performance criterion 206 and also reference 306 a compiler inlining criterion 208. These embodiments automatically identify 308 as a candidate 202 for cross-module inlining a routine which (a) satisfies the execution performance criterion, (b) satisfies the compiler inlining criterion, and (c) according to the service history has been modified less than the specified threshold.

In some embodiments, the identifying step 308 automatically identifies at least one of the following items as a candidate for cross-module inlining: a property get routine backed by a field, a property set routine backed by a field, a property backed by bit(s) of a single field, a property backed by a constant value, a Boolean property implemented as a check against a single bit, a Boolean property implemented as a check against a NULL value, a setting constructor, an equality operator implemented as a call to .Equals( ), an inequality operator implemented as a call to an equality operator and a negation, an explicit cast operator implemented as a call to a single-argument constructor, a wrapper function that adds a constant value. These items may be identified 308 as a result of pattern matching 316, or as a result of being automatically marked 320, for example. In some embodiments, the process also uses 310 an inlining advisory tool 216 to present the routine to a developer for consideration.

Some embodiments provide a process for managing cross-module inlining. The process accesses 302 a service history for an initial collection of routines being considered, and then excludes 312 from the collection each routine which (according to the service history) has been modified more than a specified threshold and also removes 314 from the collection each routine which fails to satisfy a specified execution performance criterion. Pattern matching 316 is performed on respective codes of routines which remain in the collection, thereby locating 326 at least one relatively frequent routine pattern among routines that has been modified less than the specified threshold and that satisfies the specified execution performance criterion. The process automatically identifies 308 as a candidate for cross-module inlining a routine which has code matching at least one such relatively frequent routine pattern. In some embodiments, the process further checks 318 whether a routine located by the pattern matching has been modified more than a specified threshold.

Under one approach, a process uses a first collection of routines to generate the routine patterns 212 and then applies those routine patterns to locate matches in other code which was not used in generating the patterns. Under another approach, the same collection of routines is used to generate the patterns 212 and to search for matches while identifying 308 candidates 202.

In some embodiments, the process marks 320 the automatically identified routine with an attribute indicating the routine is a candidate for cross-module inlining. In some, the process uses 322 a binary rewriting tool to mark an automatically identified routine for inlining. In some, the process uses 310 an inlining advisory tool to present a marked automatically identified routine for developer consideration. In some, the process inlines 324 a marked automatically identified routine. These steps may be mixed in various ways, and some may be omitted. For example, one possibility is to mark 320 candidates with attributes. Another possibility is to mark (tag) candidates somehow using a binary rewriter 342. Similarly, one thing that can be done with a marked routine is to show it to a developer for consideration in an advisory tool 216, and another thing (not necessarily excluding the advisory tool) is to go ahead and inline 324 the routine.

Some embodiments accept 328 a routine pattern definition through a user interface rather than pattern matching to locate the routine pattern, and then automatically identify 308 as a candidate for cross-module inlining a routine which has code matching the accepted routine pattern 212 definition. Some embodiments receive 330 through a user interface a confirmation of a located relatively frequent routine pattern prior to automatically identifying as a candidate for cross-module inlining a routine which has code matching that confirmed routine pattern. That is, developers are allowed to say Yes (and by implication, No) to a pattern match result before the process uses pattern matches to identify inlining candidates.

In some embodiments, the process is performed within a development environment, e.g., an IDE 140 or a particular system 102. The process further ascertains 332 that the automatically identified routine will be available for use in at least one module whose identity is unspecified within the development environment when the routine is identified as a candidate for cross-module inlining. Then the process treats 334 an attempted or completed modification of the routine as an error within the development environment. However, in some embodiments the process maintains 338 an inventory of native image(s) on a target system into which the automatically identified routine has been compiled, and regenerates 340 all the inventoried native images for the target system after the routine is modified.

Figure 4:
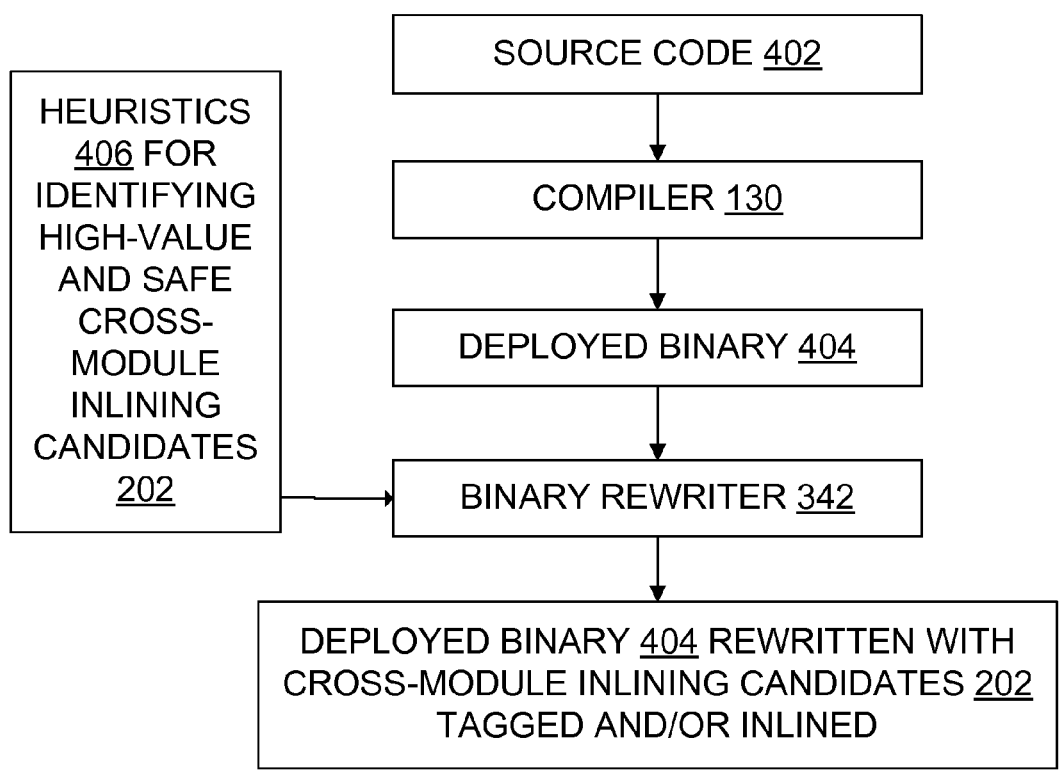
FIG. 4 is a data flow diagram further illustrating some embodiments.

As illustrated in FIG. 4, in some embodiments source code 402 for routines 124 is submitted to a compiler 130, which produces a binary 404 that is then deployed. To improve performance of the deployed code, a binary rewriter 342 guided by heuristics 406 is used to produce a new version of the deployed binary in which cross-module inlining candidates are tagged and/or inlined. The heuristics 406 implement tests for infrequently modified routines 124, frequently called routines, and/or short routines, for instance, using the service history 126, thresholds 210, and criteria 206, 208 as discussed herein.

Configured Media

Some embodiments include a configured computer-readable storage medium 112. Medium 112 may include disks (magnetic, optical, or otherwise), RAM, EEPROMS or other ROMs, and/or other configurable memory, including in particular non-transitory computer-readable media (as opposed to wires and other propagated signal media). The storage medium which is configured may be in particular a removable storage medium 114 such as a CD, DVD, or flash memory. A general-purpose memory, which may be removable or not, and may be volatile or not, can be configured into an embodiment using items such as candidate identification tools 204, inlining advisory tools 216, and routine patterns 212, in the form of data 118 and instructions 116, read from a removable medium 114 and/or another source such as a network connection, to form a configured medium. The configured medium 112 is capable of causing a computer system to perform process steps for transforming data through management of cross-module inlining as disclosed herein. FIGS. 1 through 4 thus help illustrate configured storage media embodiments and process embodiments, as well as system and process embodiments. In particular, any of the process steps illustrated in FIG. 3 and/or FIG. 4, or otherwise taught herein, may be used to help configure a storage medium to form a configured medium embodiment.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A process for managing cross-module inlining, the process utilizing a device which has at least one logical processor in operable communication with at least one memory, the process comprising the steps of:

accessing routine service histories for a collection of routines, the service histories tracking changes to the routines over time as opposed to merely summarizing current information about the routines without historic information, the service history of a given routine showing a frequency and/or an extent of modification of that given routine;

excluding from the collection each routine which, according to the routine's service history, has been modified more than a specified threshold;

removing from the collection each routine which fails to satisfy a specified execution performance criterion; and automatically identifying as a candidate for cross-module inlining a particular routine which according to the routine's service history has been modified less than a specified threshold, without reliance on persistent summary information being maintained for every entry in a routine, namely, without register stack pressure persistent summary information denoting an estimate of register stack pressure in the routine and without data cache pressure persistent summary information denoting an estimate of data cache pressure in the routine.

2. The process of claim 1, further comprising referencing an execution performance criterion, and wherein the identifying step comprises automatically identifying as a candidate for cross-module inlining a routine which satisfies the execution performance criterion and which according to the service history also has been modified less than the specified threshold.

3. The process of claim 1, further comprising referencing a compiler inlining criterion, and wherein the identifying step comprises automatically identifying as a candidate for cross-module inlining a routine which satisfies the compiler inlining criterion and which according to the service history also has been modified less frequently than the specified threshold.

4. The process of claim 3, further comprising referencing an execution performance criterion, and wherein the identifying step comprises automatically identifying as a candidate for cross-module inlining a routine which (a) satisfies the execution performance criterion, (b) satisfies the compiler inlining criterion, and (c) according to the service history has been modified less than the specified threshold.

5. The process of claim 1, wherein the identifying step comprises automatically identifying at least one of the following items as a candidate for cross-module inlining:
- a property get routine backed by a field;
- a property set routine backed by a field;
- a property backed by bit(s) of a single field;
- a property backed by a constant value;
- a Boolean property implemented as a check against a single bit;
- a Boolean property implemented as a check against a NULL value;
- a setting constructor;
- an equality operator implemented as a call to .Equals( );
- an inequality operator implemented as a call to an equality operator and a negation;
- an explicit cast operator implemented as a call to a single-argument constructor;
- a wrapper function that adds a constant value.

6. The process of claim 1, wherein the process further comprises using an inlining advisory tool to present the routine to a developer for consideration.

7. A computer-readable storage medium configured with data and with instructions that when executed by at least one processor causes the at least one processor to perform a process for managing cross-module inlining, the process comprising the steps of:
- accessing a service history for at least one routine in an initial collection of routines being considered, the service history tracking changes to the routine over time as opposed to merely summarizing current information about the routine without historic information, the service history of the routine showing a frequency and/or an extent of modification of the routine;
- excluding from the collection each routine which, according to the routine's service history, has been modified more than a specified threshold;
- removing from the collection each routine which fails to satisfy a specified execution performance criterion;
- pattern matching respective codes of routines which remain in the collection, thereby locating at least one relatively frequent routine pattern among routines that has been modified less than the specified threshold and that satisfies the specified execution performance criterion; and
- automatically identifying as a candidate for cross-module inlining a particular routine which has code matching at least one such relatively frequent routine pattern, without reliance on persistent summary information being maintained for every entry in a routine, namely, without register stack pressure persistent summary information denoting an estimate of register stack pressure in the routine and without data cache pressure persistent summary information denoting an estimate of data cache pressure in the routine.

8. The configured medium of claim 7, wherein the process further comprises checking whether a routine located by the pattern matching has been modified more frequently than a specified threshold.

9. The configured medium of claim 7, wherein the process further comprises at least one of the following steps:
- marking the automatically identified routine with an attribute indicating the routine is a candidate for cross-module inlining;
- using a binary rewriting tool to mark an automatically identified routine for inlining;
- using an inlining advisory tool to present a marked automatically identified routine for developer consideration;
- inlining a marked automatically identified routine.

10. The configured medium of claim 7, wherein the process further comprises referencing a compiler inlining criterion, and wherein the identifying step comprises automatically identifying as a candidate for cross-module inlining a routine which also satisfies the compiler inlining criterion.

11. The configured medium of claim 7, wherein the process locates at least one of the following item patterns as a relatively frequent routine pattern among routines that have been modified less than the specified threshold and that satisfy the specified execution performance criterion:
- a property get routine backed by a field;
- a property set routine backed by a field;
- a property backed by bit(s) of a single field;
- a property backed by a constant value;
- a Boolean property implemented as a check against a single bit;
- a Boolean property implemented as a check against a NULL value;
- a setting constructor;
- an equality operator implemented as a call to .Equals( );
- an inequality operator implemented as a call to an equality operator and a negation;
- an explicit cast operator implemented as a call to a single-argument constructor;
- a wrapper function that adds a constant value.

12. The configured medium of claim 11, wherein the process locates at least three of the item patterns as relatively frequent routine patterns.

13. The configured medium of claim 7, wherein the process further comprises at least one of the following steps:
- accepting a routine pattern definition through a user interface rather than pattern matching to locate the routine pattern, and then automatically identifying as a candidate for cross-module inlining a routine which has code matching the accepted routine pattern definition;
- receiving through a user interface confirmation of a located relatively frequent routine pattern prior to automatically identifying as a candidate for cross-module inlining a routine which has code matching that confirmed routine pattern.

14. The configured medium of claim 7, wherein the process is performed within a development environment, and the process further comprises ascertaining that the automatically identified routine will be available for use in at least one module whose identity is unspecified within the development environment when the routine is identified as a candidate for cross-module inlining, and then treating an attempted or completed modification of the routine as an error within the development environment.

15. The configured medium of claim 7, wherein the process further comprises maintaining an inventory of native image(s) on a target system into which the automatically identified routine has been compiled, and regenerating all the inventoried native images for the target system after the routine is modified.

16. A system for cross-module inlining candidate identification, the system comprising:
- a processor in operable communication with a memory for tool execution;

routine service histories for a collection of routines, the service histories residing in the memory, the service histories tracking changes to the routines over time as opposed to merely summarizing current information about the routines without historic information, the service history of a given routine showing a frequency and/or an extent of modification of that given routine, the collection free of any routine which, according to the routine's service history, has been modified more than a specified threshold, the collection also free of any routine which fails to satisfy a specified execution performance criterion;

an execution performance criterion also residing in the memory; and a cross-module inlining candidate identification tool in operable communication with the service histories and the execution performance criterion, the cross-module inlining candidate identification too free of reliance on persistent summary information being maintained for every entry in a routine, namely, operable without register stack pressure persistent summary information denoting an estimate of register stack pressure in the routine and without data cache pressure persistent summary information denoting an estimate of data cache pressure in the routine.

17. The system of claim 16, further comprising a compiler inlining criterion also residing in the memory and in operable communication with the cross-module inlining candidate identification tool.

18. The system of claim 16, further comprising an inlining advisory tool.

19. The system of claim 16, further comprising a pattern matcher and at least one relatively frequent routine pattern of a routine that has been modified less than a specified threshold according to the service history, the relatively frequent routine pattern(s) residing in the memory in operable communication with the cross-module inlining candidate identification tool.

20. The system of claim 16, further comprising:

at least one relatively frequent routine pattern of a routine that has been modified less than a specified threshold according to the service history, the relatively frequent routine pattern(s) residing in the memory; and a change monitor tool in operable communication with the relatively frequent routine pattern(s) and with a code base;

whereby the system is configured to raise an alarm if the change monitor tool detects a change in an implementation of a routine of the code base and the routine matches a relatively frequent routine pattern.

* * * * *